United States Patent
Ho et al.

(10) Patent No.: US 12,168,743 B2
(45) Date of Patent: Dec. 17, 2024

(54) EXTRUDED POLYURETHANE SURFACE FILMS

(71) Applicant: 3M INNOVATIVE PROPERTIES COMPANY, St. Paul, MN (US)

(72) Inventors: Charlie Chia-Tie Ho, Woodbury, MN (US); Yongshang Lu, Woodbury, MN (US); John J. Jaros, Lake Elmo, MN (US); Jay M. Jennen, Forest Lake, MN (US); Ryan M. Braun, St. Paul, MN (US); Sean P. Addison, Athens, AL (US); Trevor A. Larson, Madison, AL (US); Ricky L. Nelson, Elkmont, AL (US); Robert D. Hamann, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 294 days.

(21) Appl. No.: 16/647,655

(22) PCT Filed: Sep. 18, 2018

(86) PCT No.: PCT/US2018/051462
§ 371 (c)(1),
(2) Date: Mar. 16, 2020

(87) PCT Pub. No.: WO2019/060284
PCT Pub. Date: Mar. 28, 2019

(65) Prior Publication Data
US 2020/0277517 A1 Sep. 3, 2020

Related U.S. Application Data

(60) Provisional application No. 62/718,689, filed on Aug. 14, 2018, provisional application No. 62/561,472, filed on Sep. 21, 2017.

(51) Int. Cl.
*C09J 7/29* (2018.01)
*B29C 48/00* (2019.01)
(Continued)

(52) U.S. Cl.
CPC ............... *C09J 7/29* (2018.01); *B29C 48/022* (2019.02); *B29C 48/08* (2019.02); *B32B 27/06* (2013.01);
(Continued)

(58) Field of Classification Search
CPC ......... C09J 7/29; C09J 7/25; C09J 7/38; C09J 2475/006; C09J 2301/302; B29C 48/022;
(Continued)

(56) References Cited

U.S. PATENT DOCUMENTS 4,576,997 A 3/1986 Trotter
4,597,927 A 7/1986 Zeitler
(Continued)

FOREIGN PATENT DOCUMENTS

CA 2019877 12/1990
CN 101418203 4/2009
(Continued)

OTHER PUBLICATIONS

Machine translation of JP H06-190986 A (Year: 1994).*
(Continued)

*Primary Examiner* — Callie E Shosho
*Assistant Examiner* — Steven A Rice
(74) *Attorney, Agent, or Firm* — Carlos M. Téllez Rodríguez; 3M Innovative Properties Co

(57) ABSTRACT

Various embodiments disclosed relate to a surfacing film. The surfacing film includes a base layer. The base layer includes a thermoplastic polyurethane film comprising a reaction product of a reaction mixture of a diisocyanate, a polyester polyol having a melting temperature of at least
(Continued)

about 30° C.; and a diol chain extender. There are many reasons to use the surfacing film including easier and more cost effective manufacturing of the surfacing film by directly extruding the base layer by mixing the reaction mixture in an extruder. Another reason to use the surfacing film is that the film has improved resistance to discoloration. Another reason to use the film is that the film shows good toughness.

14 Claims, 1 Drawing Sheet

(51) Int. Cl.
  B29C 48/08 (2019.01)
  B29K 75/00 (2006.01)
  B29L 7/00 (2006.01)
  B32B 27/06 (2006.01)
  B32B 27/40 (2006.01)
  C08G 18/32 (2006.01)
  C08G 18/42 (2006.01)
  C08G 18/66 (2006.01)
  C08G 18/75 (2006.01)
  C08J 5/18 (2006.01)
  C09D 175/06 (2006.01)
  C09J 7/25 (2018.01)
  C09J 7/38 (2018.01)

(52) U.S. Cl.
  CPC .......... *B32B 27/40* (2013.01); *C08G 18/3206* (2013.01); *C08G 18/42* (2013.01); *C08G 18/4238* (2013.01); *C08G 18/664* (2013.01); *C08G 18/758* (2013.01); *C08J 5/18* (2013.01); *C09D 175/06* (2013.01); *C09J 7/25* (2018.01); *C09J 7/38* (2018.01); *B29K 2075/00* (2013.01); *B29L 2007/008* (2013.01); *B32B 2307/412* (2013.01); *B32B 2405/00* (2013.01); *C08J 2375/06* (2013.01); *C09J 2475/006* (2013.01)

(58) Field of Classification Search
  CPC ......... B29C 48/08; B32B 27/06; B32B 27/40; B32B 2307/412; B32B 2405/00; B32B 27/16; B32B 2307/748; B32B 2605/00; B32B 7/12; B32B 2307/536; B32B 7/06; B32B 27/08; B32B 5/24; B32B 27/36; C08G 18/3206; C08G 18/42; C08G 18/4238; C08G 18/664; C08G 18/758; C08J 5/18; C08J 2375/06; C09D 175/06; B29K 2075/00; B29L 2007/008
  USPC .................................................... 428/423.1
  See application file for complete search history.

(56) References Cited

U.S. PATENT DOCUMENTS

| | | | |
|---|---|---|---|
| 4,948,859 A | 8/1990 | Echols | |
| 5,360,900 A | 11/1994 | DeLeon | |
| 5,621,024 A | 4/1997 | Eberhardt | |
| 6,294,637 B1 | 9/2001 | Bräuer | |
| 7,241,854 B2 | 7/2007 | Pohlmann | |
| 8,551,285 B2 | 10/2013 | Ho | |
| 8,734,609 B2 | 5/2014 | Duffy | |
| 2004/0087754 A1 | 5/2004 | Foley | |
| 2008/0280074 A1* | 11/2008 | Sugino | B32B 27/08 428/1.55 |
| 2016/0310327 A1* | 10/2016 | Rule | A61F 13/00038 |
| 2017/0107398 A1* | 4/2017 | Ho | C08G 18/242 |
| 2017/0204234 A1 | 7/2017 | Walker, Jr. | |
| 2019/0359823 A1* | 11/2019 | Tomovic | C08G 18/758 |
| 2021/0114361 A1* | 4/2021 | Ho | C08G 18/751 |

FOREIGN PATENT DOCUMENTS

| | | | | |
|---|---|---|---|---|
| EP | 0367445 | | 5/1990 | |
| EP | 0748829 | | 12/1996 | |
| JP | H06-190986 A | * | 7/1994 | |
| WO | WO-0221167 A1 | * | 3/2002 | ....... B32B 17/10018 |
| WO | WO 2009/023424 | | 2/2009 | |
| WO | WO 2009/120548 | | 10/2009 | |
| WO | WO 2014/150305 | | 9/2014 | |
| WO | WO 2016/018749 | | 2/2016 | |

OTHER PUBLICATIONS

Chemistry LibreTexts, "25.20: Polymerization—Condensation Polymers", Apr. 30, 2022, pp. 1-2 (Year: 2022).*
Fomrez, "Fomrez (R) 44-111", May 6, 2022 (Year: 2022).*
PubChem, "Bis(4-isocyanatocyclohexyl)methane", May 7, 2022, pp. 4-5 (Year: 2022).*
APS Elastomers, "Shore a Hardness Scale Cross References", Apr. 24, 2014 (Year: 2014).*
International Search Report for PCT International Application No. PCT/US2018/051462, mailed on Jan. 17, 2019, 6pgs.

* cited by examiner

EXTRUDED POLYURETHANE SURFACE FILMS

CROSS REFERENCE TO RELATED APPLICATIONS

This application is a national stage filing under 35 U.S.C. 371 of PCT/US2018/051462, filed 18 Sep. 2018, which claims the benefit of U.S. Provisional Patent Application No. 62/561,472 filed 21 Sep. 2017 and U.S. Provisional Patent Application No. 62/718,689, filed 14 Aug. 2018, the disclosures of which are incorporated by reference in their entirety herein.

BACKGROUND

Multilayer films can include one or more layers of a polyurethane material. Some of these films can be used in surface protection applications. For example, multilayer film products can be used to protect the painted surface of selected automobile body parts.

SUMMARY OF THE DISCLOSURE

The present disclosure provides a surfacing film. The surfacing film includes a base layer. The base layer includes a thermoplastic polyurethane film comprising a reaction product of a reaction mixture of a diisocyanate, a polyester polyol having a melting temperature of at least about 30° C.; and a diol chain extender.

The present disclosure further provides a method of making a surfacing film. The method includes forming a base layer. Forming the base layer includes introducing components comprising a diisocyanate, a diol chain extender, and a polyester polyol into an extruder to provide a molten thermoplastic polyurethane, wherein the polyester polyol has a melting temperature of at least 30° C. The method further includes extruding the molten thermoplastic polyurethane through a die onto a carrier web as a uniform film. The method further includes solidifying the thermoplastic polyurethane film to obtain the base layer.

There are various reasons to use the surfacing film of the present disclosure including the following non-limiting reasons. For example, the thermoplastic polyurethane can be formed directly by mixing and reacting the components of the thermoplastic polyurethane in an extruder, which can extrude the thermoplastic polyurethane as a film. This can substantially eliminate the need to form the thermoplastic polyurethane, pelletize the thermoplastic polyurethane, and deposit the pellets into an extruder. This can result in saving costs and time in producing the film.

Additionally, according to some examples, it is possible for the provided thermoplastic polyurethane film to have a higher molecular weight than those that are formed from extruding a film from pelletized polyurethanes. This is because thermoplastic polyurethanes that are pelletized are formed by extruding a polyurethane that is repeatedly cut to form smaller pellets having shortened thermoplastic polyurethane chains, which in turn form lower weight average molecular weight polyurethane films. This cutting to form pellets can result in the thermoplastic polyurethanes films having shorter chains and lower molecular weights than the thermoplastic polyurethanes films of the instant disclosure. According to some examples, the higher molecular weight of the thermoplastic polyurethane film can help to prevent color staining in the polyurethane film by making it more difficult for discoloring agents to penetrate the polyurethane.

Additionally, according to some examples, the reactive mixture includes a chain extender that has a weight-average molecular weight of less than 250 daltons. This can help to strengthen the thermoplastic polyurethane film. For example, the Shore A hardness of the thermoplastic polyurethane film can be larger than a corresponding thermoplastic polyurethane film including a chain extender with a weight-average molecular weight exceeding 250 daltons.

Additionally, according to some examples, the polyester polyol in the reactive mixture forming the polyurethane has a melting temperature of at least 30° C. This can impart a high degree of crystallinity to the thermoplastic polyurethane film. The high degree of crystallinity can help to make the surface film easier to handle in that the thermoplastic polyurethane film is more likely to be substantially non-tacky under ambient conditions (e.g., 25° C. and 1 ATM), which can make it easier to roll the surface film prior to storage or application to a substrate.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
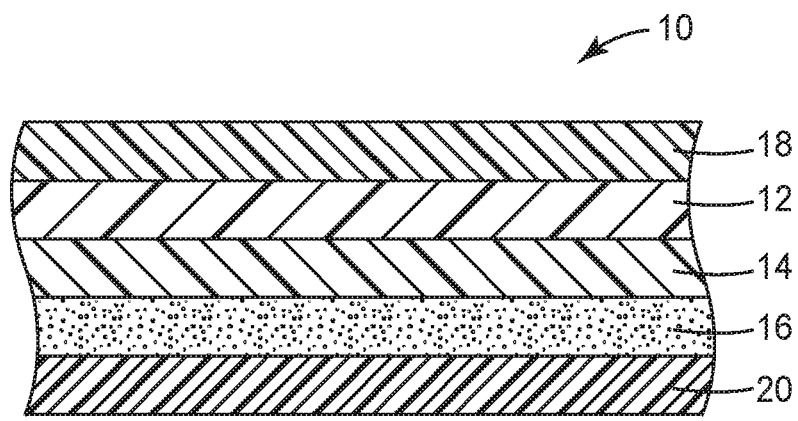
FIG. 1 is a sectional view of a surface film, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading can occur within or outside of that particular section. All publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "substituted" as used herein in conjunction with a molecule in which one or more hydrogen atoms contained therein are replaced by one or more non-hydrogen atoms. Examples of substituents or functional groups that can be substituted include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH═CH(CH$_3$), —CH═C(CH$_3$)$_2$, —C(CH$_3$)═CH$_2$, —C(CH$_3$)═CH(CH$_3$), —C(CH$_2$CH$_3$)═CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4-2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "aralkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl. Aralkenyl groups are alkenyl groups as defined herein in which a hydrogen or carbon bond of an alkyl group is replaced with a bond to an aryl group as defined herein.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include about 1 to about 12, about 1 to about 20, or about 1 to about 40 carbon atoms bonded to the oxygen atom, and can further include double or triple bonds, and can also include heteroatoms. For example, an allyloxy group or a methoxyethoxy group is also an alkoxy group within the meaning herein, as is a methylenedioxy group in a context where two adjacent atoms of a structure are substituted therewith.

The term "number-average molecular weight" ($M_n$) as used herein refers to the ordinary arithmetic mean of the molecular weight of individual molecules in a sample. It is defined as the total weight of all molecules in a sample divided by the total number of molecules in the sample. Experimentally, $M_n$ is determined by analyzing a sample divided into molecular weight fractions of species i having $n_i$ molecules of molecular weight $M_i$ through the formula $M_n = \Sigma M_i n_i / \Sigma n_i$. The $M_n$ can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, gel permeation chromatography, and sedimentation velocity.

The term "melting temperature" refers to a temperature or range of temperatures at which a material changes state from a solid to a liquid at a pressure of 1 ATM. The melting temperature can be determined using differential scanning calorimetry, where the melting temperature is taken at the end of the endothermic peak measured therein.

The polymers described herein can terminate in any suitable way. In some embodiments, the polymers can terminate with an end group that is independently chosen from a suitable polymerization initiator, —H, —OH, a substituted or unsubstituted ($C_1$-$C_{20}$)hydrocarbyl (e.g., ($C_1$-$C_{10}$)alkyl or ($C_6$-$C_{20}$)aryl) interrupted with 0, 1, 2, or 3 groups independently selected from —O—, substituted or unsubstituted —NH—, and —S—, a poly(substituted or unsubstituted ($C_1$-$C_{20}$)hydrocarbyloxy), and a poly(substituted or unsubstituted ($C_1$-$C_{20}$)hydrocarbylamino).

According to various examples of the present disclosure, a surfacing film or surface protection film includes a thermoplastic polyurethane film. The thermoplastic polyurethane film can include many suitable components. Examples of suitable components include a thermoplastic polyurethane that is a reaction product of a reaction mixture that includes a diisocyanate, a polyester polyol having a melting temperature of at least about 30° C., and a diol chain extender.

Figure 2:
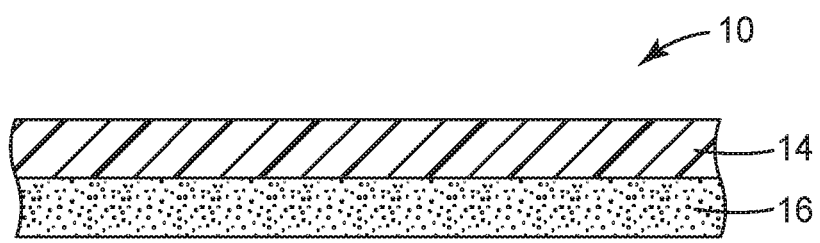
FIG. 2 is a sectional view of another surface film, in accordance with various embodiments.

FIG. 1 is a sectional view of surfacing film 10, which includes a thermoplastic polyurethane film. As shown, surfacing film 10 includes optional thermosetting polyurethane or clear coat layer 12, transparent thermoplastic polyurethane film or base layer 14 and optional pressure-sensitive adhesive layer 16. An optional releasable carrier web or liner 18 can be releasably bonded to polyurethane layer 12 along its major surface facing away from the base layer 14 so as to protect the surface of thermosetting polyurethane layer 12. If the thermosetting polyurethane layer 12 is not present, the liner 18 can be releasably bonded to base layer 14 along its major surface facing away from pressure-sensitive adhesive layer 16 to protect the base layer 14. If pressure-sensitive adhesive layer 16 is present, it can be desirable for surfacing film 10 to also include another release liner 20 releasably bonded thereto as shown so as to protect pressure-sensitive adhesive layer 16. In some examples of surfacing film 10, all of these components are not present. FIG. 2 is a sectional view of another surfacing film 10 that only includes base layer 14 and pressure-sensitive adhesive layer 16.

The thermoplastic polyurethane film can have a weight-average molecular weight in a range of from about 80,000 daltons to about 400,000 daltons, about 80,000 daltons to about 200,000 daltons, or equal to, less than, or greater than about, 80,000 daltons; 85,000; 90,000; 95,000; 100,000; 105,000; 110,000; 115,000; 120,000; 125,000; 130,000; 135,000; 140,000; 145,000; 150,000; 155,000; 160,000; 165,000; 170,000; 175,000; 180,000; 185,000; 190,000; 195,000; 200,000; 205,000; 210,000; 215,000; 220,000; 225,000; 230,000; 235,000; 240,000; 245,000; 250,000; 255,000; 260,000; 265,000; 270,000; 275,000; 280,000; 285,000; 290,000; 295,000; 300,000; 305,000; 310,000; 315,000; 320,000; 325,000; 330,000; 335,000; 340,000; 345,000; 350,000; 355,000; 360,000; 365,000; 370,000; 375,000; 380,000; 385,000; 390,000; 395,000; or 400,000 daltons. The high molecular weight of the thermoplastic polyurethane film can help to prevent discoloration of the film, at least in base layer 14. This is because the relatively high molecular weight of the thermoplastic polyurethane film can result from long chain length polyurethanes. The long chain length can result in base layer 14 being relatively tightly packed or highly entangled such that a discoloring compound cannot readily penetrate base layer 14 and cause discoloration therein. As an example, a yellowing color change of base layer 14 that is exposed to a 10% bitumen solution for 24 hours is less than that of a corresponding protection film comprising a base layer that includes a thermoplastic polyurethane film having a weight-average molecular weight of 80,000 daltons or less.

Base layer 14 can be sufficiently hard to withstand abrasion from foreign objects. As an example, a Shore A hardness of base layer 14 can be in a range of from about 70 A to about 95 A, about 83 A to about 90 A, or less than, equal to, or greater than about 70 A, 75 A, 76 A, 77 A, 78 A, 79

A, 80 A, 81 A, 82 A, 83 A, 84 A, 85 A, 86 A, 87 A, 88 A, 89 A, 90 A, 91 A, 92 A, 93 A, 94 A, or 95 A.

A thickness of base layer 14 can be in a range of from about 0.05 mm to about 2 mm, about 0.5 mm to about 1 mm, or less than, equal to, or greater than about 0.05 mm, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.05, 1.1, 1.15, 1.2, 1.25, 1.3, 1.35, 1.4, 1.45, 1.5, 1.55, 1.6, 1.65, 1.7, 1.75, 1.8, 1.85, 1.9, 1.95, or 2 mm.

As mentioned herein, the thermoplastic polyurethane is a reaction product of a reaction mixture that includes a diisocyanate, a polyester polyol having a melting temperature of at least about 30° C., and a chain extender. The diisocyanate can range from about 0.5 wt % to about 40 wt % of the reaction mixture, about 1 wt % to about 10 wt %, about 25 wt % to about 47 wt %, or less than, equal to, or greater than about 0.5 wt %, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41, 41.5, 42, 42.5, 43, 43.5, 44, 44.5, 45, 45.5, 46, 46.5, or 47 wt % of the reaction mixture. The amount of the diisocyanate in the reactive mixture can be expressed in terms of an isocyanate index. An isocyanate index can be generally understood to refer to the ratio of the equivalent amount of isocyanate functional groups used relative to the theoretical equivalent amount of hydroxy functional groups. The theoretical equivalent amount is equal to one equivalent isocyanate functional group per one equivalent hydroxyl group; this is an index of 100. According to various examples, the isocyanate index of the reactive mixture is in a range of from about 0.99 to about 1.20, about 1.00 to about 1.10, or less than equal to, or greater than about 0.99, 1.00, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, or 1.20.

An example of a suitable diisocyanate includes a diisocyanate according to Formula I having the structure:

$$O=C=N-R-N=C=O. \qquad \text{Formula I}$$

In Formula I, R is chosen from substituted or unsubstituted $(C_1-C_{40})$alkylene, $(C_2-C_{40})$alkenylene, $(C_4-C_{20})$arylene, $(C_4-C_{20})$arylene-$(C_1-C_{40})$alkylene-$(C_4-C_{20})$arylene, $(C_4-C_{20})$cycloalkylene, and $(C_4-C_{20})$aralkylene. In additional examples, the diisocyanate is chosen from dicyclohexylmethane-4,4'-diisocyanate, isophorone diisocyanate, hexamethylene diisocyanate, 1,4-phenylene diisocyanate, 1,3-phenylene diisocyanate, m-xylylene diisocyanate, tolylene-2,4-diisocyanate, toluene 2,4-diisocyanate, tolylene-2,6-diisocyanate, poly(hexamethylene diisocyanate), 1,4-cyclohexylene diisocyanate, 4-chloro-6-methyl-1,3-phenylene diisocyanate, hexamethylene diisocyanate, toluylene diisocyanate, diphenylmethane 4,4'-diisocyanate, 1,4-diisocyanatobutane, 1,8-diisocyanatooctane, 2,6-toluene diisocyanate, 2,5-toluene diisocyanate, 2,4-toluene diisocyanate, m-phenylene diisocyanate, p-phenylene diisocyanate, methylene bis(o-chlorophenyl diisocyanate, methylenediphenylene-4,4'-diisocyanate, (4,4'-diisocyanato-3,3',5,5'-tetraethyl) diphenylmethane, 4,4'-diisocyanato-3,3'-dimethoxybiphenyl (o-dianisidine diisocyanate), 5-chloro-2,4-toluene diisocyanate, 1-chloromethyl-2,4-diisocyanato benzene, tetramethyl-m-xylylene diisocyanate, 1,6-diisocyanatohexane 1,12-diisocyanatododecane, 2-methyl-1,5-diisocyanatopentane, methylenedicyclohexylene-4,4'-diisocyanate, 3-isocyanatomethyl-3,5,5-trimethylcyclohexyl isocyanate, 2,2,4-trimethylhexyl diisocyanate, or a mixture thereof.

The polyester polyol can be in a range of from about 43 wt % to about 70 wt % of the reaction mixture, about 50 wt % to about 60 wt %, or less than, equal to, or greater than about 43 wt %, 43.5, 44, 44.5, 45, 45.5, 46, 46.5, 47, 47.5, 48, 48.5, 49, 49.5, 50, 50.5, 51, 51.5, 52, 52.5, 53, 53.5, 54, 54.5, 55, 55.5, 56, 56.5, 57, 57.5, 58, 58.5, 59, 59.5, 60, 60.5, 61, 61.5, 62, 62.5, 63, 63.5, 64, 64.5, 65, 65.5, 66, 66.5, 67, 67.5, 68, 68.5, 69, 69.5, or 70 wt % of the reaction mixture. The polyester polyol can include any suitable number of hydroxyl groups. For example, the polyester polyol can include four hydroxyl groups or three hydroxyl groups. The polyester polyol can even include two hydroxyl groups such that the polyester polyol is a polyester diol. In general, the polyester polyol can be a product of a condensation reaction such as a polycondensation reaction. However, the polyester polyol is not made via a ring opening polymerization reaction products.

In examples where polyester polyol is made according to a condensation reaction, the reaction can be between one or more carboxylic acids and one or more polyols. An example of a suitable carboxylic acid includes a carboxylic acid according to Formula II, having the structure:

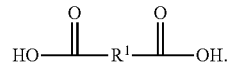

Formula II

In Formula II, $R^1$ is chosen from substituted or unsubstituted $(C_1-C_{40})$alkylene, $(C_2-C_{40})$alkylene, $(C_2-C_{40})$alkenylene, $(C_4-C_{20})$arylene, $(C_4-C_{20})$cycloalkylene, and $(C_4-C_{20})$ aralkylene. Specific examples of suitable carboxylic acids include glycolic acid (2-hydroxyethanoic acid), lactic acid (2-hydroxypropanoic acid), succinic acid (butanedioic acid), 3-hydoxybutanoic acid, 3-hydroxypentanoic acid, terepthalic acid (benzene-1,4-dicarboxylic acid), naphthalene dicarboxylic acid, 4-hydroxybenzoic acid, 6-hydroxynaphtalane-2-carboxylic acid, oxalic acid, malonic acid (propanedioic acid), adipic acid (hexanedioic acid), pimelic acid (heptanedioic acid), ethonic acid, suberic acid (octanedioic acid), azelaic acid (nonanedioic acid), sebacic acid (decanedioic acid), glutaric acid (pentanedioic acid), dedecandioic acid, brassylic acid, thapsic acid, maleic acid ((2Z)-but-2-enedioic acid), fumaric acid ((2E)-but-2-enedioic acid), glutaconic acid (pent-2-enedioic acid), 2-decenedioic acid, traumatic acid ((2E)-dodec-2-enedioic acid), muconic acid ((2E,4E)-hexa-2,4-dienedioic acid), glutinic acid, citraconic acid ((2Z)-2-methylbut-2-enedioic acid), mesaconic acid ((2E)-2-methyl-2-butenedioic acid), itaconic acid (2-methylidenebutanedioic acid), malic acid (2-hydroxybutanedioic acid), aspartic acid (2-aminobutanedioic acid), glutamic acid (2-aminopentanedioic acid), tartonic acid, tartaric acid (2,3-dihydroxybutanedioic acid), diaminopimelic acid ((2R,6S)-2,6-diaminoheptanedioic acid), saccharic acid ((2S,3S,4S,5R)-2,3,4,5-tetrahydroxyhexanedioic acid), mexooxalic acid, oxaloacetic acid (oxobutanedioic acid), acetonedicarboxylic acid (3-oxopentanedioic acid), arbinaric acid, phthalic acid (benzene-1,2-dicarboxylic acid), isophtalic acid, diphenic acid, 2,6-naphtalenedicarboxylic acid, or a mixture thereof.

An example of a suitable polyol includes a polyol according to Formula II, having the structure:

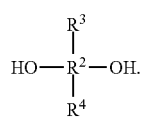

Formula II

In Formula II, $R^2$ is chosen from substituted or unsubstituted $(C_1$-$C_{40})$alkylene, $(C_2$-$C_{40})$alkenylene, $(C_4$-$C_{20})$arylene, $(C_1$-$C_{40})$acylene, $(C_4$-$C_{20})$cycloalkylene, $(C_4$-$C_{20})$aralkylene, and $(C_1$-$C_{40})$alkoxyene, and $R^3$ and $R^4$ are independently chosen from —H, —OH, substituted or unsubstituted $(C_1$-$C_{40})$alkyl, $(C_2$-$C_{40})$alkenyl, $(C_4$-$C_{20})$aryl, $(C_1$-$C_{20})$acyl, $(C_4$-$C_{20})$cycloalkyl, $(C_4$-$C_{20})$aralkyl, and $(C_1$-$C_{40})$alkoxy.

An example of another suitable polyol includes a polyol according to Formula III, having the structure:

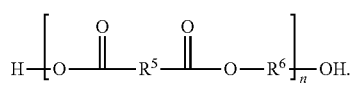

Formula III

In Formula III, $R^5$ and $R^6$ are independently chosen from substituted or unsubstituted $(C_1$-$C_{40})$alkylene, $(C_2$-$C_{40})$alkenylene, $(C_4$-$C_{20})$arylene, $(C_1$-$C_{40})$acylene, $(C_4$-$C_{20})$cycloalkylene, $(C_4$-$C_{20})$aralkylene, and $(C_1$-$C_{40})$alkoxyene and n is a positive integer greater than or equal to 1.

An example of another suitable polyol includes a polyol according to Formula IV, having the structure:

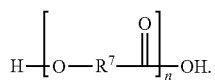

Formula IV

In Formula IV, $R^7$ is chosen from substituted or unsubstituted $(C_1$-$C_{40})$alkylene, $(C_2$-$C_{40})$alkenylene, $(C_4$-$C_{20})$arylene, $(C_1$-$C_{40})$acylene, $(C_4$-$C_{20})$cycloalkylene, $(C_4$-$C_{20})$aralkylene, and $(C_1$-$C_{40})$alkoxyene and n is a positive integer greater than or equal to 1. In specific examples, the polyester polyol includes one or more of polyglycolic acid (poly[oxy(l-oxo-1,2-ethanediyl)]), polybutylene succinate (poly(tetramethylene succinate)), poly(3-hydroxybutyrate-co-3-hydroxyvalerate), polyethylene terephthalate (poly(ethyl benzene-1,4-dicarboxylate)), polybutylene terephthalate (poly(oxy-1,4-butanediyloxycarbonyl-1,4-phenylenecarbonyl)), polytrimethylene terephthalate (poly(trimethylene terephthalate); poly(oxy-1,3-propanediyloxycarbonyl-1,4-phenylenecarbonyl)), polyethylene naphthalate (poly(ethylene 2,6-naphthalate)), poly(1,4-butylene adipate), poly(1,6-hexamethylene adipate), poly(ethylene-adipate), mixtures thereof, and copolymers thereof. However, the polyester polyol is free of polycaprolactone polyol ((1,7)-polyoxepan-2-one). The polyester polyol has a melting temperature of at least 30° C., at least 35° C., at least 40° C., at least 42° C., at least 45° C., at least 50° C., at least 55° C., at least 60° C., at least 65° C., at least 70° C., at least 75° C., at least 80° C., at least 85° C., at least 90° C., at least 95° C., at least 100° C., at least 110° C., at least 120° C., at least 130° C., at least 140° C., at least 150° C., at least 160° C., at least 170° C., at least 180° C., at least 190° C., at least 200° C., at least 210° C., at least 220° C., at least 230° C., at least 240° C., at least 250° C., at least 260° C., at least 270° C., at least 280° C., at least 290° C., at least 300° C., at least 310° C., at least 320° C., at least 330° C., at least 340° C., at least 350° C., at least 360° C., at least 370° C., at least 380° C., at least 390° C., at least 400, at least 410° C., at least 420° C., at least 430° C., at least 440° C., at least 450° C., at least 460° C., at least 470° C., at least 480° C., at least 490° C., or at least 500° C. Choosing an appropriate melting temperature can help to increase the degree of crystallinity of base layer 14. The degree of crystallinity can be determined through differential scanning calorimetry and is expressed as the fractional amount of crystallinity in the thermoplastic polyurethane film. The degree of crystallinity can be in a range of from about 30% to about 70%, about 40% to about 60%, or less than, equal to, or greater than, 30%, 35, 40, 45, 50, 55, 60, 65, or 70%. The degree of crystallinity can make it easier to roll base layer 14 as it takes a relatively high temperature to begin to liquefy base layer 14. Thus base layer 14 is less likely to stick to itself during rolling or storage. Examples of melting temperatures of some polyester polyols are provided herein at Table 1.

TABLE 1

| Polyester Polyol | Melting Temperature (° C.) |
|---|---|
| polyglycolic acid | 225 to 230 |
| polybutylene succinate | 115 |
| polyethylene terephthalate | 500 |
| polybutylene terephthalate | 433.4 |

The chain extender can be in a range of from about 2 wt % to about 13 wt % of the reaction mixture, about 1 wt % to about 10 wt %, or less than, equal to, or greater than about 2 wt %, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13 wt % of the reaction mixture.

The diol chain extender has weight-average molecular weight of less than about 250 daltons. For example a weight-average molecular weight of the diol chain extender can be in a range of from about 30 daltons to about 250 daltons, about 50 daltons to about 150 daltons, or less than equal to, or greater than about 30 daltons, 35, 40,45, 50, 55, 60, 65, 70,75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, or about 250 daltons. The diol chain extender can include any suitable number of carbons. For example, the diol chain extender can include a number-average number of about 2 carbons to about 20 carbons, about 3 carbons to about 10 carbons, or less than, equal to, or greater than about 2 carbons, 3, 4, 5, 6, 7, 8, 9, 10, 11, 12, 13, 14, 15, 16, 17, 18, 19, or 20 carbons. Diol chain extenders such as these can help to strengthen base layer 14. This can be because the relatively short chains can be stiffer than a longer chain diol. The short chain diols can be stiffer, for example, because the short chain diol is more restricted in terms of rotation about the individual bonds along the chain. Examples of suitable diol chain extenders include ethylene glycol, diethylene glycol, triethylene glycol, tetraethylene glycol, propylene glycol, dipropylene glycol, tripropylne glycol, 1,3-propanediol, 1,3-butanediol, 1,4-butanediol, neopentyl glycol, 1,6-hexanediol, 1,4-cyclohexanedimethanol, or a mixture thereof.

The thermoplastic polyurethane can include a hard segment. A hard segment generally refers to harder, less flexible polymer segment, which results from polymerization of the diisocyanate and the diol chain extender. The amount of the hard segment can be determined by calculating the total amount (wt %) of isocyanate, chain extender, and crosslinker. That total amount is then divided by the total weight of the thermoplastic polyurethane. The hard segment can be in a range of from about 30 wt % to about 55 wt % of the thermoplastic polyurethane film, about 40 wt % to about 55 wt %, or less than, equal to, or greater than about 30 wt %, 31, 32, 33, 34, 35, 36, 37, 38, 39, 40, 41, 42, 43, 44, 45, 46, 47, 48, 49, 50, 51, 52, 53, 54, or 55 wt % of the thermoplastic polyurethane film. Hard segments are present as domains, which can interact with each other to effectively form a crosslink therebetween (e.g., through a hydrogen bond). Under stress for example, through a mechanical deformation, the hard segments can become aligned in the stress direction. This alignment coupled with the hydrogen bonding can contribute to the stiffness, elastomeric resilience, or tear resistance of the thermoplastic polymeric film.

In some examples the reactive mixture can include a crosslinker. Examples of crosslinkers include polyhydroxy group compounds and polyisocyanate compound. For example, the polyhydroxy compounds can include 3 hydroxy groups or 4 hydroxy groups. The polyisocyanate can include 3 cyano groups or 4 cyano groups. While there are many suitable crosslinkers the reactive mixture is free of an aziridine crosslinker. If present, the crosslinkers can function link different thermoplastic polyurethane chains of base layer 14 (e.g., intermolecular crosslink). Alternatively, the crosslinkers can function to crosslink different sections of the thermoplastic polyurethane chains (e.g., intramolecular crosslinks).

Surfacing film 10 can be applied to many suitable substrates. Moreover surfacing film 10 can be cut to precisely match the dimensions of any desired substrate. The substrate, as an example, can be a vehicle body, a window, or a portion thereof. With respect to a car, for example, surfacing film 10 can be sized to precisely fit a portion of a hood for a specific make and model of an automobile. In addition to a hood, surfacing film 10 can be cut to conform to other features of an automobile such as a fender, a mirror, a door, a roof, a panel, a portion thereof.

Surfacing film 10 can also be sized to precisely fit a portion of a water vessel such as a hull (e.g., to protect the hull during beaching), a transom (e.g., to protect the transom from damage caused by water skis), or a bulwark (e.g., to prevent damage caused by lines). Additionally, surfacing film 10 can be applied to trains or even aerospace vehicles such as an airplane or helicopter. For example, surfacing film 10 can be applied to a blade such as a propeller blade (e.g., to protect against debris strikes such as ice), an airfoil (e.g., a wing or a helicopter blade), or a fuselage.

According to various examples, a method of making surfacing film 10 can include forming base layer 14. Base layer 14 can be formed from a reactive mixture prepared in an extruder. Examples of suitable extruders include a twin-screw extruder or a planetary extruder. Suitable twin-screw extruders include a co-rotating-twin-screw extruder or a counter-rotating-twin-screw extruder. The components of the reactive mixture (e.g., the diisocyanate, diol chain extender, and polyester polyol) can be individually or simultaneously fed into the extruder. The method is free of introducing a pellet comprising a thermoplastic polyurethane into the extruder. Thus, the reactive mixture is free of any components necessary for pelletization such as wax processing aids, or an antisticking agent. The provided methods can help to ensure that the thermoplastic polyurethane film has a weight-average molecular weight of at least 80,000 daltons. This is because pellets introduced into an extruder can be subjected to significant shear, which can shorten the thermoplastic polyurethane chains and thus reduce the weight-average molecular weight of the resulting film.

Through extrusion, base layer 14 comprising a molten thermoplastic polyurethane is formed and extruded through a die onto a carrier web as a uniform film. An example of a suitable die includes a coat hanger die. The uniform film can be further pressed by a cold roller which thermally quenches the reaction shaping the polyurethane, thereby solidifying the thermoplastic polyurethane to obtain base layer 14.

The extrusion can occur at any suitable temperature. For example, the temperature can be in a range of from about 40° C. to about 230° C., about 90° C. to about 200° C., or less than, equal to, or greater than about 40° C., 45, 50, 55, 60, 65, 70, 75, 80, 85, 90, 95, 100, 105, or 110, 115, 120, 125, 130, 135, 140, 145, 150, 155, 160, 165, 170, 175, 180, 185, 190, 195, 200, 205, 210, 215, 220, 225, or 230° C. The extrusion can occur for any suitable amount of time. For example, the extrusion can occur for a period of time ranging from about 0.5 hours to about 17 hours, about 1 hour to about 6 hours, or less than, equal to, or greater than about 0.5 hours, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, or 17 hours.

To apply pressure-sensitive adhesive layer 16 to base layer 14 it can be desirable to corona treat (e.g., air or $N_2$ corona treatment) and thermally laminate a major surface of the extruded base layer 14 to be bonded to pressure-sensitive adhesive layer 16. To accomplish this, the major surface of base layer 14, which is not in contact with the clear coat layer 12, is exposed and then corona treated. If a hot laminating process is used (e.g., clear coat layer 12 is extruded onto a releasable carrier web or liner), the carrier web or liner can need to be first stripped off of clear coat layer 12.

Base layer 14 and clear coat layer 12 can be bonded together, for example by laminating the layers at an elevated temperature and pressure. For example, one major surface of the clear coat layer 12 can be cold laminated under pressure to one major surface of the extruded base layer 14, while at least the one major surface of the base layer 14 is, or both base layer 14 and the clear coat layer 12 are, at an elevated temperature that is sufficiently high enough to facilitate adequate bonding between clear coat layer 12 and base layer 14. As used herein, cold laminating refers to the layers being laminated together between two nip surfaces in about a room or ambient temperature environment (e.g., the layers are not kept in an intentionally heated environment during the laminating process). The nip surfaces can be two nip rollers, a stationary nip surface (e.g., a low friction surface of a flat or curved plate) and a nip roller, or two stationary nip surfaces. The laminating process can even be performed in a below ambient temperature environment (that is, the layers are intentionally cooled during the laminating process). For example, one or both of the nip surfaces can be chilled to a temperature below ambient, in order to cool the exposed major surfaces of the polyurethane layers (that is, the major surfaces the nip surfaces contact). The use of such chilled surfaces can eliminate, or at least help reduce, warping of the layers resulting from the laminating process. At the same time, the major surfaces that make contact at the interface between the polyurethane layers remain at the elevated temperature long enough to be sufficiently bonded together by the laminating pressure exerted by the nip surfaces. Such cold laminating can be accomplished by laminating the newly extruded base layer 14 directly onto a preformed clear coat layer 12, while the base layer 14 material still retains significant heat from the extrusion process. Clear coat layer 12 can be still releasably bonded to the carrier web or liner, to provide additional structural strength.

Alternatively, one major surface of clear coat layer 12 can also be bonded to one major surface of the extruded base layer 14 by using a hot laminating process. With this process, the initial temperature of both clear coat layer 12 and base layer 14 is about room temperature or at least a temperature that is too low to facilitate adequate bonding between clear coat layer 12 and base layer 14. Then, at least the one major surface of base layer 14, at least the one major surface of clear coat layer 12, or the one major surfaces of both clear coat layer 12 and base layer 14 are heated to an elevated temperature that is sufficiently higher than room temperature to facilitate adequate bonding between the clear coat layer 12 and base layer 14 under the laminating pressure. With the hot laminating process, the layers are heated before or during the application of the laminating pressure. If a hot laminating process is used, a major surface of base layer 14 can be releasably laminated to a readily releasable carrier web or liner (for example, a polyester carrier web) directly after base layer 14 is extruded, in order to provide the freshly base layer 14 with additional structural support.

Acceptable minimum temperatures and pressures for bonding the layers together, using either the cold or hot laminating process, have included a temperature of at least about 200° F. (93° C.) and a pressure of at least about 15 lb/in$^2$ or psi (10.3 N/cm$^2$).

EXAMPLES

Various embodiments of the present invention can be better understood by reference to the following Examples which are offered by way of illustration. The present invention is not limited to the Examples given herein.

Examples

Materials

TABLE 2

| Designation | Description | Supplier |
| --- | --- | --- |
| FOMREZ-44-111 | Polyester polyol | Chemtura, Philadelphia, PA |
| IRGANOX 1076 | Antioxidant, Octadecyl-3-(3,5-di-tert.butyl-4-hydroxyphenyl)-propionate | BASF, Ludwigshafen, Germany |
| 1,4 Butanediol | Chain extender diol | BASF |
| TINUVIN-292 | Hindered amine | BASF |
| TINUVIN-571 | UV light stabilizer | BASF |
| T12 | Dibutyl tin dilaurate catalyst | Air Products, Detroit, MI |
| DESMODUR W | Bis(4-isocyantocyclohexyl)methane | Bayer, Leverkusen, Germany |
| Glycerol | Crosslinker | Sigma-Aldrich, St. Louis, MO |
| ESTANE | Caprolactone polyol based thermoplastic polyurethane resin pellet made from batch reactor process followed by granulizing and underwater pelletizing | Lubrizol, Wickliffe, OH |

TABLE 2-continued

| Designation | Description | Supplier |
| --- | --- | --- |
| ESTANE ALR CL87A-V | Caprolactone based thermoplastic polyurethane resin pellet | Lubrizol |
| ESTANE D91 F87MI | Caprolactone polyol based thermoplastic polyurethane resin pellet made from a continuous process followed by underwater pelletizing | Lubrizol |

Test Methods
Gel Permeation Chromatography (GPC) Molecular Weight Measurement

Film samples were analyzed by conventional GPC against polystyrene molecular weight standards using tetrahydrofuran (THF) as solvent and eluent. Molecular weight results were not absolute but were relative to the hydrodynamic volume of polystyrene in THF. Thermoplastic polyurethane ("TPU") resin sample solutions of concentration 2 mg/mL were prepared in tetrahydrofuran (THF, stabilized with 250 ppm of butylated hydroxytoluene). The samples were allowed to dissolve for approximately 3 hours. The sample solutions were filtered through 0.45 micrometer polytetrafluoroethylene syringe filters and then analyzed by gas phase chromatography.

GPC Conditions:

| | |
| --- | --- |
| Column set | 2 mm × 300 mm × 7.5 mm POLYPORE columns with guard |
| Col Heater | 40° C. |
| Eluent | THF at 1.0 mL/min |
| Injection | 100 microliters |
| Detector | Differential refractive index |

The measured weight average molecular weight ("MW$_w$") was reported.

Dynamic Mechanical Analysis

The dynamic mechanical properties were measured by using a Rheometrics Solids Analyzer (RSA) from TA Instruments, New Castle, DE. The temperature was monitored between −50° C. and 180° C. at 0.1% strain and 1.0 Hz. Glass transition temperature ("Tg", obtained from the peak of Tan delta) and softening temperature were reported.

24 Hour 10% Bitumen in Diesel Fluid Staining

Standard bitumen was dissolved in diesel fluid to produce 10 wt % bitumen solution. Film was applied on a white painted panel (steel panel with 648DM640 basecoat and RK8014 clear coat, from ACT Test Panels, Hillsdale, MI). The 10 wt % bitumen solution was then applied on the surface of the film at about 1 inch (2.5 cm) diameter and left on the film surface for 24 hours. After 24 hours, it was cleaned using naphtha. The yellowing color change ("Δb") of film surface before and after stained was measured by a standard colorimeter.

Haze Value

For haze values, the thermoplastic polyurethane film sample was laminated to a transfer adhesive (isooctyl acrylate/acrylic acid copolymer) and applied onto a 6 mil (150 micrometer) layer of polyester terephthalate (PET) film. The initial haze was measured by a HAZEGARD and initial film haze was reported. Additionally, in some instances the film sample was heat aged for 7 days at 80° C., and then the haze was measured, again with a HAZEGARD and reported as "Haze after 7 days heat aging at 80° C.".

In the following Examples (EX-1 to EX-3), the twin screw extruded aliphatic thermoplastic polyurethane films (TPF's) had hard segment content maintained at about 48.25 wt %, and a Shore A hardness maintained at about 87 A. Shore A hardness was measured according to ASTM standard D2240-15

Example 1 (EX-1)

All the ingredients including 504.7 grams of pre-melted FOMREZ-44-111 (having a melting temperature of 60° C.) at 100° C., 5 grams of IRGANOX-1076, 0.3 grams of T12 dibutyltin dilaurate catalyst, 88.6 grams of 1,4 butanediol, 393.9 grams of DESMODUR W, 3 grams of TINUVIN-292, and 4.5 grams of TINUVIN-571 were fed separately into a twin-screw extruder. The extruder setup, conditions, and temperature profiles were similar to that described in Example No. 1 and in Table 1 in U.S. Pat. No. 8,551,285. The isocyanate index was NCO/OH=1.01 and hard segment was at 48.25 wt %. The resulting aliphatic thermoplastic polyurethane film (TPF) was extruded as a 150 micrometers thick layer onto a polyester carrier web. The TPF was aged 2 weeks at ambient temperature before testing, with test results as summarized in Table 3.

Example 2 (EX-2)

All the ingredients including 505.2 grams of pre-melted FOMREZ-44-111 (having a melting temperature of 60° C.) at 100° C., 5 grams of IRGANOX-1076, 0.3 grams of T12 dibutyltin dilaurate catalyst, 85.7 grams of 1,4 butanediol, 397.2 grams of DESMODUR W, 3 grams of TINUVIN-292, and 4.5 grams of TINUVIN-571 were fed separately into the twin screw extruder. The extruder setup, conditions, and temperature profiles were similar to that described in Example No. 1 and in Table 1 in U.S. Pat. No. 8,551,285. The isocyanate index was NCO/OH=1.04 and hard segment content was 48.25%. The resulting aliphatic thermoplastic polyurethane film (TPF) was extruded as a 150 micrometers thick layer onto a polyester carrier web. The TPF was aged 2 weeks at ambient temperature before testing, with test results as summarized in Table 3.

Example 3 (EX-3)

All the ingredients including 509.7 grams of pre-melted FOMREZ-44-111 (having a melting temperature of 60° C.) at 100° C., 5 grams of IRGANOX-1076, 1.0 grams of T12 dibutyltin dilaurate catalyst, 87.1 grams of 1,4 butanediol, 0.9 grams of glycerol, 394.5 grams of DESMODUR W, 3 grams of TINUVIN-292, and 4.5 grams of TINUVIN-571 were fed separately into the twin-screw extruder. The extruder setup, conditions, and temperature profiles were similar to that described in Example No. 1 and in Table 1 in U.S. Pat. No. 8,551,285. The isocyanate index was NCO/OH=1.01 and hard segment was at 48.25%. The hydroxyl group crosslinker was 1.0% based on the total hydroxyl mole %. The resulting aliphatic thermoplastic polyurethane film (TPF) was extruded as a 150 micrometers thick layer onto a polyester carrier web. The TPF was aged 2 weeks at ambient temperature before testing, with test results as summarized in Table 3.

Comparative Example 1 (CE-1)

Thermoplastic polyurethane resin pellet ESTANE D91F87MI was produced by twin screw reactive extrusion process followed by pelletization of the resin in underwater bath. The TPU pellet, which comprised processing wax and anti-sticking agents, was extruded as a 150 micrometers thick film onto a polyester carrier web, by the same twin screw extruder at similar extrusion temperature profiles as in Example 1. The TPF was aged 2 weeks at ambient temperature before testing, with test results as summarized in Table 3.

Comparative Example 2 (CE-2)

Thermoplastic polyurethane resin pellet ESTANE ALR CL87 A-V, which comprised processing wax and anti-sticking agent, was extruded as a 150 micrometers thick film onto a polyester carrier web, by the same twin screw extruder at similar extrusion temperature profiles as in Example 1. The TPF was aged 2 weeks at ambient temperature before testing, with test results as summarized in Table 3.

TABLE 3

| Sample | $MW_W$ | Softening temp., ° C. | Tg, ° C. | Initial film haze | Haze after 7 days heat aging at 80° C. | Δb |
|---|---|---|---|---|---|---|
| EX-1 | 98,300 | 110.8 | 28 | 0.79 | 1.03 | 9.82 |
| EX-2 | 249,000 | 128.0 | 30.4 | 0.78 | ND | 7.96 |
| EX-3 | 139,000 | 113.1 | 31.7 | 0.79 | ND | 8.36 |
| CE-1 | 58,300 | 99.1 | 16.5 | 1.78 | 8.10 | 14.3 |
| CE-2 | 81,000 | 98.7 | 24.3 | 1.20 | 2.20 | 12.48 |

In Table 3, "ND" = not determined

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed can be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a surfacing film comprising:
a base layer comprising:
a thermoplastic polyurethane film comprising a reaction product of a reaction mixture comprising:
a diisocyanate; and
a polyester polyol having a melting temperature of at least 30° C.; and
a diol chain extender.

Embodiment 2 provides the surfacing film of Embodiment 1, wherein a weight-average molecular weight of the thermoplastic polyurethane film is in a range of from about 80,000 daltons to about 400,000 daltons.

Embodiment 3 provides the surfacing film of any one of Embodiments 1 or 2, wherein a melting temperature of the polyester polyol is at least 40° C.

Embodiment 4 provides the surfacing film of any one of Embodiments 1-3, wherein the diisocyanate has the structure:

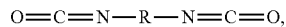

wherein R is chosen from substituted or unsubstituted $(C_1-C_{40})$alkylene, $(C_2-C_{40})$alkylene, $(C_2-C_{40})$alkenylene, $(C_4-C_{20})$arylene, $(C_4-C_{20})$arylene-$(C_1-C_{40})$alkylene-$(C_4-C_{20})$arylene, $(C_4-C_{20})$cycloalkylene, and $(C_4-C_{20})$aralkylene.

Embodiment 5 provides the surfacing film of any one of Embodiments 1-4, wherein the diisocyanate is chosen from dicyclohexylmethane-4,4'-diisocyanate, isophorone diisocyanate, hexamethylene diisocyanate, 1,4-phenylene diisocyanate, 1,3-phenylene diisocyanate, m-xylylene diisocyanate, tolylene-2,4-diisocyanate, toluene 2,4-diisocyanate, tolylene-2,6-diisocyanate, poly(hexamethylene diisocyanate), 1,4-cyclohexylene diisocyanate, 4-chloro-6-methyl-1,3-phenylene diisocyanate, hexamethylene diisocyanate, toluylene diisocyanate, diphenylmethane 4,4'-diisocyanate, 1,4-diisocyanatobutane, 1,8-diisocyanatooctane, or a mixture thereof.

Embodiment 6 provides the surfacing film of any one of Embodiments 1-5, wherein the polyester polyol is a product of a condensation reaction.

Embodiment 7 provides the surfacing film of any one of Embodiments 1-6, wherein the polyester polyol is free of ring opening polymerization reaction products.

Embodiment 8 provides the surfacing film of any one of Embodiments 1-7, wherein the polyester polyol is a polyester diol.

Embodiment 9 provides the surfacing film of any one of Embodiments 1-8, wherein the polyester polyol comprises one or more of polyglycolic acid, polybutylene succinate, poly(3-hydroxybutyrate-co-3-hydroxyvalerate), polyethylene terephthalate, polybutylene terephthalate, polytrimethylene terephthalate, polyethylene naphthalate, and copolymers thereof.

Embodiment 10 provides the surfacing film of any one of Embodiments 6-9, wherein the condensation reaction comprises a reaction between at least one of:
a plurality of carboxylic acids; and
a carboxylic acid and a polyol.

Embodiment 11 provides the surfacing film of Embodiment 10, wherein the carboxylic acid has the structure:

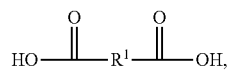

wherein $R^1$ is chosen from substituted or unsubstituted $C_{40}$)alkylene, $(C_2-C_{40})$alkylene, $(C_2-C_{40})$alkenylene, $(C_4-C_{20})$arylene, $(C_4-C_{20})$cycloalkylene, and $(C_4-C_{20})$aralkylene.

Embodiment 12 provides the surfacing film of any one of Embodiments 10 or 11, wherein the carboxylic acid is chosen from glycolic acid, lactic acid, succinic acid, 3-hydoxybutanoic acid, 3-hydroxypentanoic acid, terepthalic acid, naphthalene dicarboxylic acid, 4-hydroxybenzoic acid, 6-hydroxynaphtalane-2-carboxylic acid, oxalic acid, malonic acid, adipic acid, pimelic acid, ethonic acid, suberic acid, azelaic acid, sebacic acid, glutaric acid, dedecandioic acid, brassylic acid, thapsic acid, maleic acid, fumaric acid, glutaconic acid, 2-decenedioic acid, traumatic acid, muconic acid, glutinic acid, citraconic acid, mesaconic acid, itaconic acid, malic acid, aspartic acid, glutamic acid, tartonic acid, tartaric acid, diaminopimelic acid, saccharic acid, mexooxalic acid, oxaloacetic acid, acetonedicarboxylic acid, arbinaric acid, phtalic acid, isophtalic acid, diphenic acid, 2,6-naphtalenedicarboxylic acid, or a mixture thereof.

Embodiment 13 provides the surfacing film of any one of Embodiments 10-12, wherein the polyol has the structure:

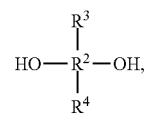

wherein $R^2$ is chosen from substituted or unsubstituted $C_{40}$)alkylene, $(C_2-C_{40})$alkenylene, $(C_4-C_{20})$arylene, $C_{40}$) acylene, $(C_4-C_{20})$cycloalkylene, $(C_4-C_{20})$aralkylene, and $(C_1-C_{40})$alkoxyene, and $R^3$ and $R^4$ are independently chosen from —H, —OH, substituted or unsubstituted $C_{40}$)alkyl, $(C_2-C_{40})$alkenyl, $(C_4-C_{20})$aryl, $(C_1-C_{20})$acyl, $(C_4-C_{20})$cycloalkyl, $(C_4-C_{20})$aralkyl, and $(C_1-C_{40})$alkoxy.

Embodiment 14 provides the surfacing film of any one of Embodiments 1-12, wherein polyester polyol has the structure:

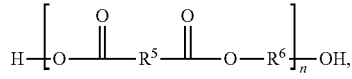

wherein $R^5$ and $R^6$ are independently chosen from substituted or unsubstituted $(C_1-C_{40})$alkylene, $(C_2-C_{40})$alkenylene, $(C_4-C_{20})$arylene, i-$C_{40}$)acylene, $(C_4-C_{20})$cycloalkylene, $(C_4-C_{20})$aralkylene, and $(C_1-C_{40})$alkoxyene and n is a positive integer greater than or equal to 1.

Embodiment 15 provides the surfacing film of any one of Embodiments 1-12, wherein the polyester polyol has the structure:

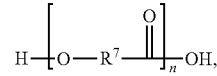

wherein $R^7$ is chosen from substituted or unsubstituted $(C_1-C_{40})$alkylene, $(C_2-C_{40})$alkenylene, $(C_4-C_{20})$arylene, i-$C_{40}$)acylene, $(C_4-C_{20})$cycloalkylene, $(C_4-C_{20})$aralkylene, and $(C_1-C_{40})$alkoxyene and n is a positive integer greater than or equal to 1.

Embodiment 16 provides the surfacing film of any one of Embodiments 1-15, wherein the diol chain extender is chosen from ethylene glycol, diethylene glycol, triethylene glycol, tetraethylene glycol, propylene glycol, dipropylene glycol, tripropylne glycol, 1,3-propanediol, 1,3-butanediol, 1,4-butanediol, neopentyl glycol, 1,6-hexanediol, 1,4-cyclohexanedimethanol, or a mixture thereof.

Embodiment 17 provides the surfacing film of any one of Embodiments 1-16, wherein the diol chain extender has a weight-average molecular weight of less than about 250 daltons.

Embodiment 18 provides the surfacing film of any one of Embodiments 1-17, wherein the thermoplastic polyurethane comprises a hard segment in a range of from about 30 wt % to about 55 wt %.

Embodiment 19 provides the surfacing film of any one of Embodiments 1-18, wherein the thermoplastic polyurethane film comprises a hard segment in a range of from about 40 wt % to about 55 wt %.

Embodiment 20 provides the surfacing film of any one of Embodiments 1-19, wherein the base layer is substantially free of at least one of a wax, an antisticking agent, and a processing aid.

Embodiment 21 provides the surfacing film of Embodiment 20, wherein a yellowing color change of the protection film exposed to a 10% bitumen solution for 24 hours is less than that of a corresponding protection film comprising a base layer that includes at least one of a wax, an anti-sticking agent, and a processing aid.

Embodiment 22 provides the surfacing film of any one of Embodiments 1-21, wherein the base layer is transparent.

Embodiment 23 provides the surfacing film of any one of Embodiments 1-22, wherein an initial film haze of the base layer is in a range of from 0.7 to about 1.0.

Embodiment 24 provides the surfacing film of any one of Embodiments 1-23, further comprising a clear coat layer attached to a second major surface of the base layer opposite the first major surface.

Embodiment 25 provides the surfacing film of Embodiment 24, wherein the clear coat layer comprises a thermosetting polyurethane.

Embodiment 26 provides the surfacing film of any one of Embodiments 1-25, wherein the polyurethane of the base layer is at least partially crosslinked.

Embodiment 27 provides the surfacing film of Embodiment 26, wherein the polyurethane is crosslinked with a hydroxyl crosslinker.

Embodiment 28 provides the surfacing film of any one of Embodiments 1-27, wherein the polyester polyol is free of polycaprolactone polyol.

Embodiment 29 provides the surfacing film, of any one of Embodiments 1-28, wherein the surfacing film is a surface protection film.

Embodiment 30 provides the surfacing film of any one of Embodiments 1-29, further comprising a pressure-sensitive adhesive layer disposed on a major surface of the base layer.

Embodiment 31 provides the surfacing film of any one of Embodiments 1-30, where a Shore A hardness of the base layer is in a range of from about 70 A to about 95 A.

Embodiment 32 provides the surfacing film of any one of Embodiments 1-31, where a Shore A hardness of the base layer is in a range of from about 83 A to about 90 A.

Embodiment 33 provides an assembly comprising the surfacing film of any one of Embodiments 1-32.

Embodiment 34 provides the assembly of Embodiment 33, further comprising a substrate chosen from a section of a vehicle body or a window, wherein the surfacing film is attached to the substrate.

Embodiment 35 provides the assembly of Embodiment 34, wherein the section of the vehicle is chosen from a hood, a fender, a mirror, a door, a roof, a panel, a portion thereof, a hull, a propeller, a blade, an airfoil, fuselage, or a combination thereof.

Embodiment 36 provides a method of forming the surfacing film of any one of Embodiments 1-35, the method comprising the steps of:
forming a base layer by a process comprising:
introducing components comprising a diisocyanate, a diol chain extender, and a polyester polyol into an extruder to provide a molten thermoplastic polyurethane, wherein the polyester polyol has a melting temperature of at least 30° C.;
extruding the molten thermoplastic polyurethane through a die onto a carrier web as a uniform film; and
solidifying the thermoplastic polyurethane film to obtain the base layer.

Embodiment 37 provides a method of making a surfacing film, the method comprising the steps of:
forming a base layer by a process comprising:
introducing components comprising a diisocyanate, a diol chain extender, and a polyester polyol into an extruder to provide a molten thermoplastic polyurethane, wherein the polyester polyol has a melting temperature of at least 30° C.;
extruding the molten thermoplastic polyurethane through a die onto a carrier web as a uniform film; and
solidifying the thermoplastic polyurethane film to obtain the base layer.

Embodiment 38 provides the method of Embodiment 37, further comprising laminating a pressure sensitive adhesive layer onto a first major surface of the base layer.

Embodiment 39 provides the method of Embodiment 38, further comprising laminating a clear coating comprising a thermosetting polyurethane onto a second major surface of the base layer.

Embodiment 40 provides the method of any one of Embodiments 37 or 39, wherein an isocyanate index of the components of the thermoplastic polyurethane is in a range of from about 0.99 to about 1.20.

Embodiment 41 provides the method of any one of Embodiments 37-40, wherein an isocyanate index of the components of the thermoplastic polyurethane is in a range of from about 1.00 to about 1.10.

Embodiment 42 provides the method of any one of Embodiments 37-41, wherein the extruder is a twin-screw extruder or a planetary extruder.

Embodiment 43 provides the method of Embodiment 42, wherein the twin-screw extruder is a co-rotating-twin-screw extruder or a counter-rotating-twin-screw extruder.

Embodiment 44 provides the method of any one of Embodiments 37-43, wherein a weight-average molecular weight of the polyurethane film is in a range of from about 80,000 daltons to about 400,000 daltons.

Embodiment 45 provides the method of any one of Embodiments 37-44, wherein a weight-average molecular weight of the polyurethane film is in a range of from about 100,000 daltons to about 250,000 daltons.

Embodiment 46 provides the method of any one of Embodiments 37-45, wherein the diisocyanate has the structure:

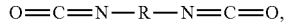

wherein R is chosen from substituted or unsubstituted $(C_1-C_{40})$alkylene, $(C_2-C_{40})$alkylene, $(C_2-C_{40})$alkenylene, $(C_4-C_{20})$arylene, $(C_4-C_{20})$arylene-$(C_1-C_{40})$alkylene-$(C_4-C_{20})$arylene, $(C_4-C_{20})$cycloalkylene, and $(C_4-C_{20})$aralkylene.

Embodiment 47 provides the method of any one of Embodiments 37-46, wherein the diisocyanate is chosen from dicyclohexylmethane-4,4'-diisocyanate, isophorone diisocyanate, hexamethylene diisocyanate, 1,4-phenylene diisocyanate, 1,3-phenylene diisocyanate, m-xylylene diisocyanate, tolylene-2,4-diisocyanate, toluene 2,4-diisocyanate, tolylene-2,6-diisocyanate, poly(hexamethylene diisocyanate), 1,4-cyclohexylene diisocyanate, 4-chloro-6-methyl-1,3-phenylene diisocyanate, hexamethylene diisocyanate, isophorone diisocyanate, toluylene diisocyanate, diphenylmethane 4,4'-diisocyanate, 1,4-diisocyanatobutane, 1,8-diisocyanatooctane, or a mixture thereof.

Embodiment 48 provides the method of any one of Embodiments 37-47, wherein the polyester polyol is a product of a condensation reaction.

Embodiment 49 provides the method of any one of Embodiments 37-48, wherein the polyester polyol is free of ring opening polymerization reaction products.

Embodiment 50 provides the method of any one of Embodiments 37-49, wherein the polyester polyol is a polyester diol.

Embodiment 51 provides the method of any one of Embodiments 37-50, wherein the diol chain extender has a weight-average molecular weight of about 250 daltons.

Embodiment 52 provides the method of any one of Embodiments 37-51, wherein the polyester polyol comprises one or more of polyglycolic acid, polybutylene succinate, poly(3-hydroxybutyrate-co-3-hydroxyvalerate), polyethylene terephthalate, polybutylene terephthalate, polytrimethylene terephthalate, polyethylene naphthalate, and copolymers thereof.

Embodiment 53 provides the method of any one of Embodiments 48-52, wherein the condensation reaction comprises a reaction between at least one of:
a plurality of carboxylic acids; and
a carboxylic acid and a polyol.

Embodiment 54 provides the method of Embodiment 53, wherein the carboxylic acid has the structure:

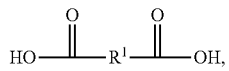

wherein $R^1$ is chosen from $(C_1-C_{40})$alkylene, $(C_2-C_{40})$alkylene, $(C_2-C_{40})$alkenylene, $(C_4-C_{20})$arylene, $(C_4-C_{20})$cycloalkylene, and $(C_4-C_{20})$aralkylene.

Embodiment 55 provides the method of any one of Embodiments 53 or 54, wherein the carboxylic acid is chosen from glycolic acid, lactic acid, succinic acid, 3-hydoxybutanoic acid, 3-hydroxypentanoic acid, terepthalic acid, naphthalene dicaboxylic acid 4-hydroxybenzoic acid, 6-hydroxynaphtalane-2-carboxylic acid, oxalic acid, malonic acid, adipic acid, pimelic acid, ethonic acid, subenic acid, azelaic acid, sebacic acid, glutaric acid, dedecandioic acid, brassylic acid, thapsic acid, maleic acid, fumaric acid, glutaconic acid, 2-decenedioic acid, traumatic acid, muconic acid, glutinic acid, citraconic acid, mesaconic acid, itaconic acid, malic acid, aspartic acid, glutamic acid, tartonic acid, tartaric acid, diaminopimelic acid, saccharic acid, mexooxalic acid, oxaloacetic acid, acetonedicarboxylic acid, arbinaric acid, phthalic acid, isophtalic acid, diphenic acid, 2,6-naphtalenedicarboxylic acid, or a mixture thereof.

Embodiment 56 provides the method of any one of Embodiments 53-55, wherein the polyol has the structure:

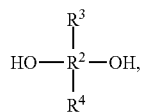

wherein $R^2$ is chosen from $(C_1-C_{40})$alkylene, $(C_2-C_{40})$alkenylene, $(C_4-C_{20})$arylene, $(C_1-C_{40})$acylene, $(C_4-C_{20})$cycloalkylene, $(C_4-C_{20})$aralkylene, and $(C_1-C_{40})$alkoxyene, and $R^3$ and $R^4$ are independently chosen from —H, —OH, $(C_1-C_{40})$alkyl, $(C_2-C_{40})$alkenyl, $(C_4-C_{20})$aryl, $(C_1-C_{20})$acyl, $(C_4-C_{20})$cycloalkyl, $(C_4-C_{40})$aralkyl, and $(C_1-C_{40})$alkoxy.

Embodiment 57 provides the method of any one of Embodiments 37-56, wherein polyester polyol has the structure:

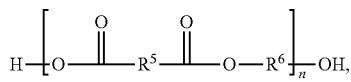

wherein $R^5$ and $R^6$ are independently chosen from substituted or unsubstituted $(C_1-C_{40})$alkylene, $(C_2-C_{40})$alkenylene, $(C_4-C_{20})$arylene, $(C_1-C_{20})$acylene, $(C_4-C_{20})$cycloalkylene, $(C_4-C_{20})$aralkylene, and $(C_1-C_{40})$alkoxyene and n is a positive integer greater than or equal to 1.

Embodiment 58 provides the method of any one of Embodiments 37-57, wherein the polyester polyol has the structure:

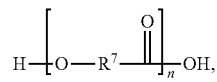

wherein $R^7$ is chosen from substituted or unsubstituted $(C_1-C_{40})$alkylene, $(C_2-C_{40})$alkenylene, $(C_4-C_{20})$arylene, $(C_1-C_{40})$acylene, $(C_4-C_{20})$cycloalkylene, $(C_4-C_{20})$aralkylene, and $(C_1-C_{40})$alkoxyene and n is a positive integer greater than or equal to 1.

Embodiment 59 provides the method of any one of Embodiments 37-58, wherein the diol chain extender is chosen from ethylene glycol, diethylene glycol, triethylene glycol, tetraethylene glycol, propylene glycol, dipropylene glycol, tripropylne glycol, 1,3-propanediol, 1,3-butanediol, 1,4-butanediol, neopentyl glycol, 1,6-hexanediol, 1,4-cyclohexanedimethanol, or a mixture thereof.

Embodiment 60 provides the method of any one of Embodiments 37-59, wherein the thermoplastic polyurethane film comprises a hard segment in a range of from about 30% to about 55%.

Embodiment 61 provides the method of any one of Embodiments 37-60, wherein the thermoplastic polyurethane film comprises a hard segment in a range of from about 40% to about 55%.

Embodiment 62 provides the method of any one of Embodiments 37-61, wherein the surfacing film is transparent.

Embodiment 63 provides the method of any one of Embodiments 37-62, further comprising a clear coat layer attached to a second major surface of the base layer opposite the first major surface.

Embodiment 64 provides the method of Embodiment 63, wherein the clear coat layer comprises a thermosetting polyurethane.

Embodiment 65 provides the method of any one of Embodiments 37-64, wherein the polyurethane film of the base layer is at least partially crosslinked.

Embodiment 66 provides the method of any one of Embodiments 37-65, wherein the components comprises a hydroxyl crosslinker.

Embodiment 67 provides the method of any one of Embodiments 37-66, wherein the components are substantially free of an aziridine crosslinker.

Embodiment 68 provides a surfacing film formed according to the method of any one of Embodiments 37-68.

Embodiment 70 provides a method of using the surfacing film of any one of Embodiments 1-36, 68, or formed according to the method of any one of Embodiments 37-67, the method comprising:

contacting the surfacing film with a substrate.

Embodiment 71 provides the method of Embodiment 70, further comprising contacting the pressure surface adhesive of the body layer with the substrate.

Embodiment 72 provides the method of any one of Embodiment 70 or 71, wherein the substrate is selected from a section of a vehicle body or a window.

Embodiment 73 provides the method of Embodiment 72, wherein the section of the vehicle is chosen from a hood, a fender, a mirror, a door, a roof, a panel, a portion thereof, a hull, a propeller, a blade, an airfoil, fuselage, or a combination thereof.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A surfacing film comprising the following layers in the sequence listed:
    clear coat comprising a thermosetting polyurethane,
    an extruded base layer in direct contact with the clear coat, wherein the base layer comprises:
        a thermoplastic polyurethane film comprising a reaction product of a reaction mixture comprising:
            a diisocyanate; and
            a polyester polyol having a melting temperature of at least about 30° C.; and
            a diol chain extender,
        wherein a weight-average molecular weight of the thermoplastic polyurethane film is in a range of from about 80,000 daltons to about 400,000 daltons, wherein the thermoplastic polyurethane film comprises a hard segment in a range of from about 30 wt % to about 49 wt %,
        wherein the base layer has a Shore A hardness from about 70A to about 95A
    pressure-sensitive adhesive layer in direct contact with the base layer on the opposite side as the clear coat,
    a releasable carrier web or liner in direct contact with the pressure sensitive adhesive on the opposite side as the base layer.

2. The surfacing film of claim 1, wherein the diisocyanate is chosen from dicyclohexylmethane-4,4'-diisocyanate, isophorone diisocyanate, hexamethylene diisocyanate, 1,4-phenylene diisocyanate, 1,3-phenylene diisocyanate, m-xylylene diisocyanate, tolylene-2,4-diisocyanate, toluene 2,4-diisocyanate, tolylene-2,6-diisocyanate, poly (hexamethylene diisocyanate), 1,4-cyclohexylene diisocyanate, 4-chloro-6-methyl-1,3-phenylene diisocyanate, hexamethylene diisocyanate, toluylene diisocyanate, diphenylmethane 4,4'-diisocyanate, 1,4-diisocyanatobutane, 1,8-diisocyanatooctane, or a mixture thereof.

3. The surfacing film of claim 1, wherein the polyester polyol is a product of a condensation reaction.

4. The surfacing film of claim 3, wherein the condensation reaction comprises a reaction between at least one of:
    a plurality of carboxylic acids; and
    a carboxylic acid and a polyol.

5. The surfacing film of claim 4, wherein the carboxylic acid is chosen from glycolic acid, lactic acid, succinic acid, 3-hydoxybutanoic acid, 3-hydroxypentanoic acid, terepthalic acid, naphthalene dicarboxylic acid, 4-hydroxybenzoic acid, 6-hydroxynaphtalane-2-carboxylic acid, oxalic acid, malonic acid, adipic acid, pimelic acid, ethonic acid, suberic acid, azelaic acid, sebacic acid, glutaric acid, dedecandioic acid, brassylic acid, thapsic acid, maleic acid, fumaric acid, glutaconic acid, 2-decenedioic acid, traumatic acid, muconic acid, glutinic acid, citraconic acid, mesaconic acid, itaconic acid, malic acid, aspartic acid, glutamic acid, tartonic acid, tartaric acid, diaminopimelic acid, saccharic acid, mexooxalic acid, oxaloacetic acid, acetonedicarboxylic acid, arbinaric acid, phtalic acid, isophtalic acid, diphenic acid, 2,6-naphtalenedicarboxylic acid, or a mixture thereof.

6. The surfacing film of claim 1, wherein the polyester polyol is a polyester diol.

7. The surfacing film of claim 1, wherein the polyester polyol comprises one or more of polyglycolic acid, polybutylene succinate, poly (3-hydroxybutyrate-co-3-hydroxyvalerate), polyethylene terephthalate, polybutylene terephthalate, polytrimethylene terephthalate, polyethylene naphthalate, poly (1,4-butylene adipate), poly (1,6-hexamethylene adipate), poly (ethylene-adipate), mixtures thereof, and copolymers thereof.

8. The surfacing film of claim 1, wherein the diol chain extender is chosen from ethylene glycol, diethylene glycol, triethylene glycol, tetraethylene glycol, propylene glycol, dipropylene glycol, tripropylne glycol, 1,3-propanediol, 1,3-butanediol, 1,4-butanediol, neopentyl glycol, 1,6-hexanediol, 1,4-cyclohexanedimethanol, or a mixture thereof.

9. The surfacing film of claim 1, wherein the diol chain extender has a weight-average molecular weight of less than about 250 daltons.

10. A method of making a surfacing film, the method comprising the steps of:
    forming a base layer by a process comprising:
        introducing components comprising a diisocyanate, a diol chain extender, and a polyester polyol into an extruder to provide a molten thermoplastic polyurethane, wherein the polyester polyol has a melting temperature of at least 30° C.;
        extruding the molten thermoplastic polyurethane through a die onto a carrier web as a uniform film; and
        solidifying the thermoplastic polyurethane film to obtain the base layer, wherein a weight-average molecular weight of the thermoplastic polyurethane film is in a range of from about 80,000 daltons to about 400,000 daltons,
    laminating a pressure sensitive adhesive layer onto a first major surface of the base layer,
    laminating a clear coating comprising a thermosetting polyurethane onto a second major surface of the base layer,
    providing a releasable carrier web or liner in direct contact with the pressure sensitive adhesive on the opposite side as the base layer;

wherein the thermoplastic polyurethane film comprises a hard segment in a range of from about 30 wt % to about 49 wt %, wherein the base layer has a Shore A hardness from about 70A to about 95A.

11. The method of claim 10, wherein an isocyanate index of the components of the thermoplastic polyurethane is in a range of from about 0.99 to about 1.20.

12. The method of claim 10, wherein the diisocyanate is chosen from dicyclohexylmethane-4,4'-diisocyanate, isophorone diisocyanate, hexamethylene diisocyanate, 1,4-phenylene diisocyanate, 1,3-phenylene diisocyanate, m-xylylene diisocyanate, tolylene-2,4-diisocyanate, toluene 2,4-diisocyanate, tolylene-2,6-diisocyanate, poly (hexamethylene diisocyanate), 1,4-cyclohexylene diisocyanate, 4-chloro-6-methyl-1,3-phenylene diisocyanate, hexamethylene diisocyanate, toluylene diisocyanate, diphenylmethane 4,4'-diisocyanate, 1,4-diisocyanatobutane, 1,8-diisocyanatooctane, or a mixture thereof.

13. The method of claim 10, wherein the polyester polyol is a product of a condensation reaction.

14. The method of claim 10, wherein the polyester polyol comprises one or more of polyglycolic acid, polybutylene succinate, poly (3-hydroxybutyrate-co-3-hydroxyvalerate), polyethylene terephthalate, polybutylene terephthalate, polytrimethylene terephthalate, polyethylene naphthalate, poly (1,4-butylene adipate), poly (1,6-hexamethylene adipate), poly (ethylene-adipate), mixtures thereof, and copolymers thereof.

* * * * *